United States Patent
Sun et al.

(10) Patent No.: US 8,811,904 B2
(45) Date of Patent: Aug. 19, 2014

(54) METHOD AND APPARATUS FOR DOWNLINK BEAM FORMING IN TD-CDMA SYSTEM

(75) Inventors: Changguo Sun, Shanghai (CN); Yingmin Wang, Shanghai (CN); Na Wu, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 1642 days.

(21) Appl. No.: 12/160,396

(22) PCT Filed: Jan. 9, 2007

(86) PCT No.: PCT/CN2007/000080
§ 371 (c)(1),
(2), (4) Date: Sep. 17, 2010

(87) PCT Pub. No.: WO2007/082460
PCT Pub. Date: Jul. 26, 2007

(65) Prior Publication Data
US 2011/0003552 A1    Jan. 6, 2011

(51) Int. Cl.
H04B 1/00 (2006.01)
H04B 15/00 (2006.01)
H04W 72/08 (2009.01)
H04B 7/06 (2006.01)
H04W 16/28 (2009.01)
H04W 48/16 (2009.01)

(52) U.S. Cl.
CPC ........... H04B 7/0617 (2013.01); H04W 72/082 (2013.01); H04W 16/28 (2013.01); H04W 48/16 (2013.01)
USPC .......................................... 455/63.1; 455/63.4

(58) Field of Classification Search
CPC ...... H04B 7/0617; H04B 7/086; H04W 16/28
USPC .......................................... 455/39, 63.1, 63.4
See application file for complete search history.

(56) References Cited

U.S. PATENT DOCUMENTS

| 6,317,586 | B1 | 11/2001 | Haardt |
| 2002/0196767 | A1* | 12/2002 | Sim .............................. 370/342 |
| 2003/0073435 | A1* | 4/2003 | Thompson et al. ........... 455/428 |
| 2003/0100269 | A1* | 5/2003 | Lehtinen et al. ................ 455/69 |
| 2003/0162501 | A1* | 8/2003 | Haardt et al. .................... 455/63 |
| 2004/0037263 | A1* | 2/2004 | Zeira ............................. 370/347 |
| 2005/0101253 | A1* | 5/2005 | Pajukoski et al. ............ 455/63.1 |
| 2005/0101354 | A1 | 5/2005 | Yang |
| 2006/0292990 | A1* | 12/2006 | Karabinis et al. ............ 455/63.4 |

FOREIGN PATENT DOCUMENTS

| CN | 1665161 | 9/2005 |
| CN | 1700801 | 11/2005 |
| JP | 2003-534708 A | 11/2003 |

OTHER PUBLICATIONS

Japanese Office Action for corresponding Japanese Patent Application No. 2008-550613 mailed Apr. 26, 2011.
Extended European Search Report for corresponding European Patent Application No. 07702012.1 mailed Jul. 19, 2012.
Schubert, M. et al. "Downlink beamforming for TD/CDMA multipath channels", Acoustics, Speech, and Signal Processing, 2000. ICASSP '00. Proceeding S. 2000 IEEE International Conference Jun. 5-9, 2000, vol. 5, pp. 2993-2996.
Indian Office Action for corresponding Indian Patent Application No. 1524/MUMNP/2008 mailed Jan. 29, 2013.

\* cited by examiner

Primary Examiner — Yuwen Pan
Assistant Examiner — Ayodeji Ayotunde
(74) Attorney, Agent, or Firm — Merchant & Gould P.C.

(57) ABSTRACT

The present invention discloses a method and an apparatus for downlink beam forming in a TD-CDMA system. The method includes: acquiring the spatial covariance matrixes of all uplink slot interference user signals and the downlink slots in which the interference user signals locate; obtaining the interference spatial covariance matrixes of each downlink slot based on the downlink slots in which the interference user signals locate and the spatial covariance matrixes of the interference user signals; determining the beam forming weight coefficient of downlink expected user signals based on the interference spatial covariance matrixes of each downlink slot and the spatial covariance matrixes of the downlink expected user signals; implementing beam forming based on the beam forming weight coefficient of downlink expected user signals.

6 Claims, 7 Drawing Sheets

-Prior Artspecial slot

| Slot sequence number | Slot allocation | Expected user | Interference user |
|---|---|---|---|
| Slot 1 | Uplink 1 | 1、2 | 1'、2'、3' |
| Slot 2 | Uplink 2 | 3、4 | 4'、5'、6' |
| Slot 3 | Uplink 3 | 5、6 | 7'、8'、9' |
| Slot 4 | Downlink 1 | 1、2 | 1'、2'、3' |
| Slot 5 | Downlink 2 | 3、4 | 4'、5'、6' |
| Slot 6 | Downlink 3 | 5、6 | 7'、8'、9' |

-Prior Art-

| Slot sequence number | Slot allocation | Expected users | Measured interference users |
|---|---|---|---|
| Slot 1 | Uplink 1 | ~ | 1', 2', 3', 4' |
| Slot 2 | Uplink 2 | ~ | 5', 6', 7', 8', 9' |
| Slot 3 | Downlink 1 | 1, 2, 3, 4 | 1', 2', 3' |
| Slot 4 | Downlink 2 | 5 | 4', 5' |
| Slot 5 | Downlink 3 | 6 | 6', 7', 8' |
| Slot 6 | Downlink 4 | 6 | 9' |

METHOD AND APPARATUS FOR DOWNLINK BEAM FORMING IN TD-CDMA SYSTEM

FIELD OF THE INVENTION

The present invention relates to mobile communication techniques, particularly to a method and an apparatus for downlink beam forming in a TD-CDMA system.

BACKGROUND OF THE INVENTION

Beam forming for smart antennas may reduce multi-access interference in a CDMA (Code Division Multiple Access) system and improve system capacity. When an interference signal is measurable, a spatial covariance matrix of the interference signal may be obtained. Suppressing interference signal is considered during beam forming weight coefficient calculation, so that an optimal interference suppressing effect can be achieved.

When a Time Division-Code Division Multiple Access (TD-CDMA) system is receiving signals, received expected signals and interference signals are all in the same slot. The received uplink expected user signals and the received uplink interference user signals may be directly used to calculate the weight coefficient of the receiving beam forming. When a TD-CDMA system is transmitting downlink beam forming, the received uplink expected user signals and the received uplink interference user signals are commonly used to estimate the weight coefficient of downlink transmitting beam forming. Taking the method for downlink beam forming shown in FIG. 1 as an example, in Step S101, spatial covariance matrixes of expected user signals and spatial covariance matrixes of interference user signals can be estimated based on some received uplink expected user signals and interference user signals in the slot in which the expected user signals locate; in step S102, based on the spatial covariance matrixes of the expected user signals and the spatial covariance matrixes of the interference user signals, the expected users' beam forming weight coefficients may be calculated according to certain rules (for example, maximal signal to noise ratio rule or maximal signal to interference ratio rule, etc.); in Step S103, transmitting beam forming can be implemented based on the obtained expected users' weight coefficients.

However, the above mentioned method is based on an assumption that the uplink/downlink expected users and the interference users are completely symmetrical, namely, the expected users and the interference users in some uplink time-slot are exactly the same with the expected users and the interference users in the corresponding downlink slot. The time slot structure and the allocation method of the uplink/downlink time slots are shown in FIG. 2, wherein the interference users may be considered as the users from other cells. The uplink expected users 1, 2 and the uplink interference users 1', 2', 3' are in time slot 1, and the downlink expected users 1, 2 and the downlink interference users 1', 2', 3' are in time slot 4, namely, the uplink time slot 1 and the downlink time slot 4 are corresponding to each other.

In respect to a TD-CDMA system having a symmetry relationship, transmitting beam forming certainly can be implemented according to a traditional method. However, services in a TD-CDMA system are sometimes asymmetric; the amount of uplink/downlink time slots should be flexibly configured and can not be fixed according predefined allocation method. Furthermore, flexible channel allocation scheme may allocate users' uplink/downlink time slots without a fixed corresponding relationship. In these cases, the above mentioned traditional beam forming method aiming to suppressing interference is not feasible any more.

SUMMARY OF THE INVENTION

The present invention aims at providing a downlink beam forming method in a TD-CDMA system. According to the method, a beam forming to suppress interference under the condition of asymmetric services in the TD-CDMA system can be implemented.

The invention provides a downlink beam forming method in a TD-CDMA system, comprising: acquiring spatial covariance matrixes of all uplink slot interference user signals and downlink slots in which the interference user signals locate; obtaining an interference spatial covariance matrix of each downlink slot based on the downlink slots in which the interference user signals locate and the spatial covariance matrixes of the interference user signals; determining beam forming weight coefficients of downlink expected user signals based on the interference spatial covariance matrixes of each downlink slot and spatial covariance matrixes of downlink expected user signals; and implementing beam forming based on the beam forming weight coefficients of the downlink expected user signals.

The step of acquiring downlink slots in which the interference user signals locate comprises: acquiring from a corresponding relationship between the uplink slots and the downlink slots in which all predefined cell user signals locate; or a base station acquiring sequence numbers of the downlink slots in which the interference user signals locate from a radio network controller; or if interference user signals are all in cells controlled by a same base station, the base station obtaining sequence numbers of the downlink slots in which the interference user signals locate by looking up a table.

Channel estimation is applied to all uplink slot interference user signals by a channel estimator to obtain the spatial covariance matrixes of the interference user signals $$R_I^{(m)} = E\{H_I^{(m)} H_I^{(m)H}\}, m=1,\ldots,M,$$

wherein m is the sequence number of the interference user signal, M represents there are M interference user signals totally, $H_I^{(m)}$ represents multiple antenna channel estimation of the $m^{th}$ interference user, and $H_I^{(m)H}$ represents a conjugate transpose operation of $H_I^{(m)}$.

A formula to calculate the interference spatial covariance matrixes of the downlink slots is $$R_{I,n} = \sum_{\forall u_m | t_d(m)=n} R_I^{(m)},$$

wherein m is the sequence number of the interference user signal, $u_m$ represents the $m^{th}$ interference user signal, $t_d(m)$ represents the sequence number of the downlink slot in which the $m^{th}$ interference user signal locates, and n represents the number of any downlink slot. The above formula shows that the interference spatial covariance matrix of one downlink slot is a sum of the interference spatial covariance matrixes of all user signals in the downlink slot.

A formula to calculate the beam forming weight coefficients of the downlink expected user signals is $$w^{(k)} = \underset{w}{\mathrm{argmax}}\left(\frac{w^H R_{xx}^{(k)} w}{w^H (R_{I,n} + \lambda I) w}\right),$$

wherein k is a positive integer, w represents any variable, $w^H$ represents a conjugate transpose operation of w, I represents a unit array of antenna dimensions, $\lambda$ represents noise power or a constant factor proportional to the interference power, and w(k) represents the beam forming weight coefficient of the $k^{th}$ downlink expected user signal.

The beam forming method comprises determining transmitting sequences of the downlink expected user signals at all antennas and a formula to calculate the transmitting sequences is $$s_{k_a} = \sum_{k=1}^{K} s^{(k)} w_{k_a}^{(k)},$$

wherein $S_{k_a}$ represents the transmitting sequence of the $k^{th}$ downlink expected user signal, $k_a$ represents the $k_a^{th}$ antenna, and $W_{k_a}^{(k)}$ represents the beam forming weight coefficient of the $k^{th}$ downlink expected user signal at the $k_a^{th}$ antenna.

The step of beam forming is implemented by a multiple user signal beam former.

The invention determines the downlink slots in which all interference user signals locate and calculates the interference spatial covariance matrixes of all downlink slots, so that the beam forming weight coefficients of all downlink expected user signals are obtained to implement beam forming. Therefore, the beam forming method of the invention is feasible in the cases of both slot symmetry and slot asymmetry.

Another technique problem to be solved by the invention is to provide a downlink beam forming apparatus in a TD-CDMA system. The apparatus can implement beam forming to suppress interference under the condition of asymmetric services in the TD-CDMA system.

The invention provides a downlink beam forming apparatus in a TD-CDMA system, comprising:

an inference user information acquiring module, for acquiring spatial covariance matrixes of all uplink slot interference user signals and the downlink slots in which the interference user signals locate;

a spatial covariance matrix acquiring module, for acquiring spatial covariance matrixes of the uplink interference user signals, and obtaining interference spatial covariance matrixes of the downlink slots based on the downlink slots in which the uplink interference user signals locate, and acquiring spatial covariance matrixes of downlink expected user signals;

a beam forming weight coefficient acquiring module, for determining beam forming weight coefficients of the downlink expected user signals based on the interference spatial covariance matrixes of each downlink slot and the spatial covariance matrixes of the downlink expected user signals; and a beam forming module, for implementing beam forming based on the beam forming weight coefficients of the downlink expected user signals.

Furthermore, acquiring the downlink slots in which the interference user signals locate by the interference user information acquiring module comprises:

acquiring from a corresponding relationship between the uplink slots and the downlink slots in which all predefined cell user signals locate; or acquiring sequence numbers of the downlink slots in which the interference user signals locate from a radio network controller; or for the interference user signals in cells controlled by a same base station, the base station obtaining sequence numbers of the downlink slots in which the interference user signals locate by looking up a table.

Furthermore, the spatial covariance matrix acquiring module utilizing a channel estimator to apply channel estimation to all uplink slot interference user signals to obtain the spatial covariance matrixes of the interference user signals $$R_I^{(m)} = E\{H_I^{(m)} H_I^{(m)H}\}, m=1,\ldots,M,$$

wherein m is the sequence number of the interference user signal, M represents there are M interference user signals totally, $H_I^{(m)}$ represents multiple antenna channel estimation of the $m^{th}$ interference user, and $H_I^{(m)H}$ represents a conjugate transpose operation of $H_I^{(m)}$.

Furthermore, the spatial covariance matrix acquiring module acquires the interference spatial covariance matrixes of the downlink slots by a formula of $$R_{I,n} = \sum_{\forall u_m | t_d(m) = n} R_I^{(m)},$$

wherein m is the sequence number of the interference user signal, $u_m$ represents the $m^{th}$ interference user signal, td(m) represents the downlink slot in which the $m^{th}$ interference user signal locates, and n represents the sequence number of any downlink slot.

Furthermore, the beam forming weight coefficient acquiring module acquires the beam forming weight coefficients of the downlink expected user signals by a formula of $$w^{(k)} = \underset{w}{\mathrm{argmax}}\left(\frac{w^H R_{xx}^{(k)} w}{w^H (R_{I,n} + \lambda I) w}\right),$$

wherein k is a positive integer, w represents any variable, $w^H$ represents a conjugate transpose operation of w, I represents a unit array of antenna dimensions, $\lambda$ represents noise power or a constant factor proportional with the interference power, and w(k) represents the beam forming weight coefficient of the $k^{th}$ downlink expected user signal.

Furthermore, the beam forming module is used to determine transmitting sequences of the downlink expected user signals at all antennas and a formula to calculate the transmitting sequences is $$s_{k_a} = \sum_{k=1}^{K} s^{(k)} w_{k_a}^{(k)},$$

wherein $S_{k_a}$ represents the transmitting sequence of the $k^{th}$ downlink expected user signal, $k_a$ represents the $k_a^{th}$ antenna, and $W_{k_a}^{(k)}$ represents the beam forming weight coefficient of the $k^{th}$ downlink expected user signal at the $k_a^{th}$ antenna.

The apparatus according to the invention determines the downlink slots in which all interference user signals locate and calculates the interference spatial covariance matrixes of all downlink slots, so that the beam forming weight coefficients of all downlink expected user signals are obtained to implement beam forming. Therefore, the beam forming apparatus of the invention is feasible in the cases of both slot symmetry and slot asymmetry.

DETAILED DESCRIPTION OF THE INVENTION

The preferred embodiments of the present invention will be described in details with reference to the accompanying drawings. The terminologies and the words used in the invention and the content of the claims are not limited to literal and ordinary meanings but include the meanings and the concept in accordance with the techniques of the invention, since we, as inventors, should define terminologies so that the invention could be well explained. Therefore, the configurations disclosed in the description and the accompanying drawings are only the preferred embodiments other than all technique characteristics of the invention. It should be understood that there are a variety of equivalent implementations and modified implementations.

Figure 1:
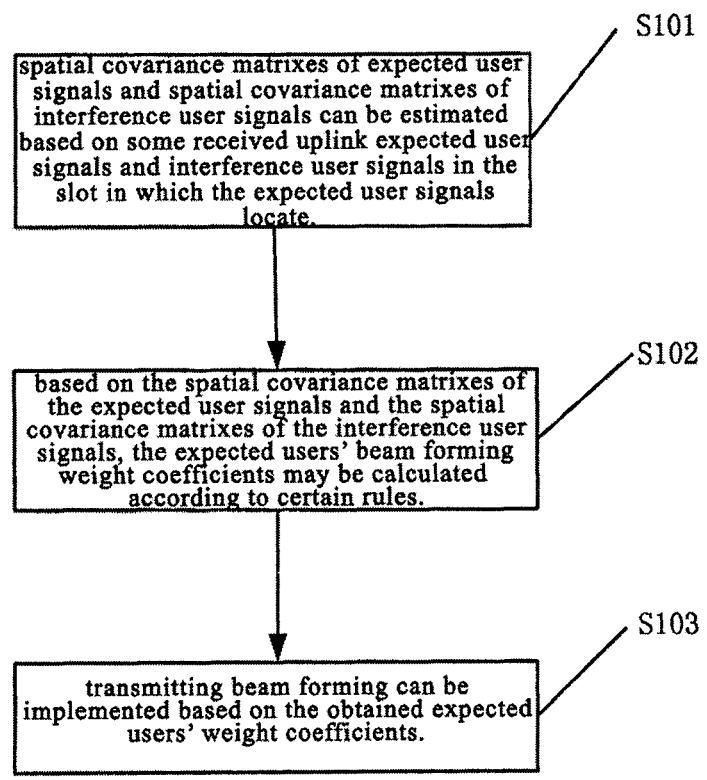
FIG. 1 is a flowchart showing a conventional downlink beam forming method.
Figure 2:
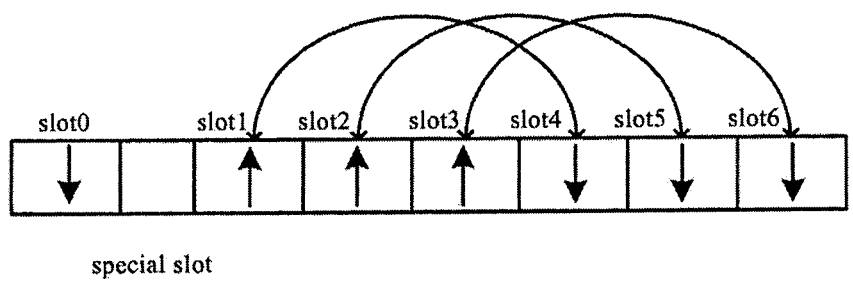
FIG. 2 shows a time slot structure corresponding to the method shown in FIG. 1 and an allocation table of uplink/downlink time slots.
Figure 3:
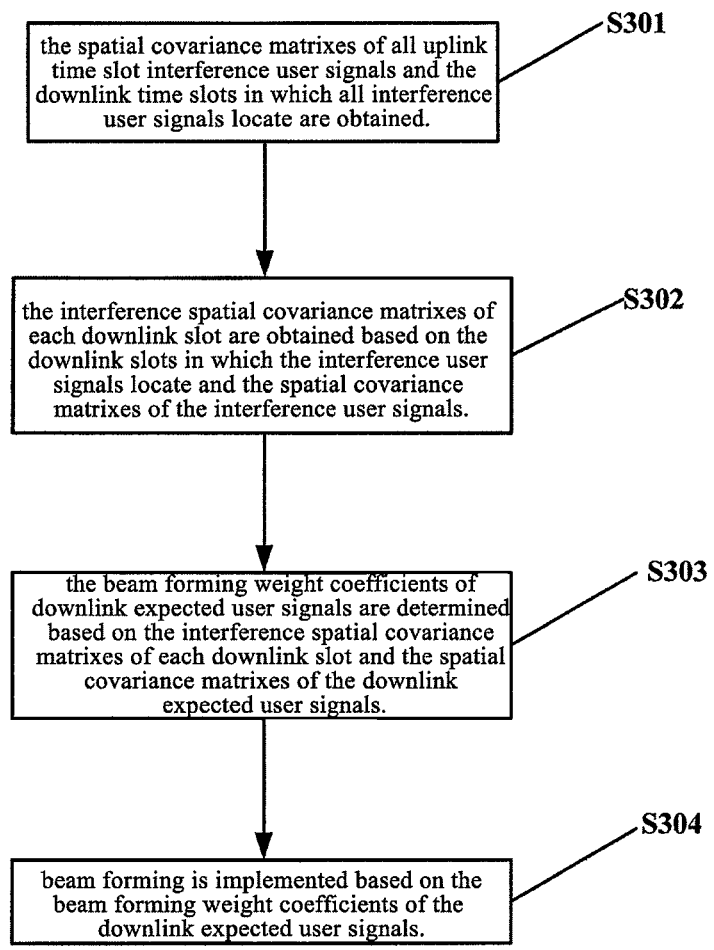
FIG. 3 is a flowchart showing the downlink beam forming method according to the first embodiment of the invention.

FIG. 3 is a flowchart according to the first embodiment of the invention.

As shown in FIG. 3, in step S301, the spatial covariance matrixes of all uplink time slot interference user signals and the downlink time slots in which all interference user signals locate are obtained. During this process, channel estimation is applied to all uplink time slot interference user signals, and the spatial covariance matrixes of the interference user signals are obtained. The interference user signals are determined by the power threshold of the interference signals. Taking the totally M interference user signals $u_1, u_2, \ldots, u_M$ in all uplink time slots as an example, the suffix m in the interference user signal $u_m$ (m=1, ..., M) represents the sequence number of the interference user signal. Channel estimation is applied to M interference signals to obtain M spatial covariance matrixes:

$$R_I^{(1)}, R_I^{(2)}, \ldots, R_I^{(M)}$$

wherein, $$R_I^{(m)} = E\{H_I^{(m)} H_I^{(m)H}\}, m=1, \ldots, M,$$

wherein, $E\{H_I^{(m)} H_I^{(m)H}\}$ represents an operation to solve a mathematical expectation of a random variable, that is, a mean value. $H_I^{(m)H}$ represents the conjugate transpose operation of matrix $H_I^{(m)}$.

$H_I^{(m)}$ represents multiple antenna channel estimation for the $m^{th}$ interference user signal. There are a variety of methods for channel estimation, such as utilizing a fundamental Steiner channel estimator (a low cost estimation method) or its modifications. An interference user signal may be either the interference user signal in a local cell or that in other cells. Whether the user signals occupying the same wireless resource are regarded as interference user signals is related to the specific system and algorithms in the physical layer. For example, when beam forming is applied to a TD-SCDMA (Time Division-Synchronous Code Division Multiple Access) system using joint detection technique, it is assumed that signal interference in the local cell is eliminated by the joint detection and only user signal interference from other cells is considered.

Furthermore, in this step, the downlink slots in which M interference user signals locate should be determined:

$$t_d(m), m=1, \ldots, M.$$

A base station may provide the corresponding relationship between uplink slots and downlink slots of user signals in the same cell. In respect to user signals from other cells, the methods to determine the downlink slots in which interference user signals locate include a predefined method, a signaling transmission method and a table lookup method:

(1) The predefined method: this is a default method. At the network initialization, the corresponding relationship between the uplink slots and the downlink slots in which all signals of users in cells locate can be determined.

(2) The signaling transmission method: a base station applies to obtain the sequence number of the downlink slots in which interference user signals locate from RNC (Radio Access Network Controller).

(3) The table lookup method: if interference user signals are all in the cell controlled by the same base station, that base station can obtain the sequence number of the downlink slots in which interference user signals locate by looking up a table.

Then, entering step S302, the interference spatial covariance matrixes of each downlink slot are obtained based on the downlink slots in which the interference user signals locate and the spatial covariance matrixes of the interference user signals. In this step, it is assumed that there are totally N downlink slots in the same cell, so that the interference user signal set of any downlink slot n(n=1, 2, ... N) is $$I_n = \{\forall u_m | t_d(m) = n\},$$

wherein, $\forall u_m$ represents any or all uplink slot interference user signals $u_m$.

The spatial covariance matrix of interference signals in slot n is:

$$R_{I,n} = \sum_{\forall u_m | t_d(m) = n} R_I^{(m)},$$

that is, the spatial covariance matrix of interference signals in slot n is the sum of the spatial covariance matrixes of all interference user signals in slot n.

Then, entering step S303, the beam forming weight coefficient of downlink expected user signals is determined based on the interference spatial covariance matrixes of each downlink slot and the spatial covariance matrixes of the downlink expected user signals. It is assumed that the slot is n in which some downlink expected user k locates, then the downlink beam forming weight coefficient is $$w^{(k)} = \mathop{\mathrm{argmax}}_{w}\left(\frac{w^H R_{xx}^{(k)} w}{w^H (R_{I,n} + \lambda I) w}\right),$$

wherein, $$\mathop{\mathrm{argmax}}_{w}\left(\frac{w^H R_{xx}^{(k)} w}{w^H (R_{I,n} + \lambda I) w}\right)$$

represents w making $$\frac{w^H R_{xx}^{(k)} w}{w^H (R_{I,n} + \lambda I) w}$$

maximum, w may be any variable, I represents a unit array of antenna dimensions, λ may represents noise power or a constant factor proportional to interference power, and $R_{xx}^{(k)}$ represents the spatial covariance matrix of the $k^{th}$ downlink expected user signal. The matrix may be obtained by many methods in conventional techniques. One method is physical layer measurement, namely, channel estimation result $H_d$ of the expected user multiple antenna is obtained according to channel estimation, and the channel estimation result is used to obtain the spatial covariance matrix of the expected user $Rxx = E\{H_d H_d^H\} \cdot E\{H_d H_d^H\}$ represents a mathematics expectation operation of random variables, that is, a mean value. $H_d^H$ represents the conjugate transpose operation of $H_d$. W(k) (k=1, 2 ... K) represents the downlink transmitting beam forming weight coefficient of expected user signals, and $$w^{(k)} = \begin{bmatrix} w_1^{(k)} \\ w_2^{(k)} \\ \vdots \\ w_{K_a}^{(k)} \end{bmatrix},$$

$W_{k_a}^{(k)}$ represents the downlink transmitting beam forming weight coefficient of $k^{th}$ expected user signal at the $k_a^{th}$ antenna.

Finally, entering step S304, beam forming is implemented based on the beam forming weight coefficients of the downlink expected user signals. It is assumed that the transmitting data sequence of expected user signal k is $S^{(k)}$ then the transmitting sequence at the antenna $k_a(k_a=1, 2 \ldots K_a)$ is $$s_{k_a} = \sum_{k=1}^{K} s^{(k)} w_{k_a}^{(k)}.$$

Figure 4:
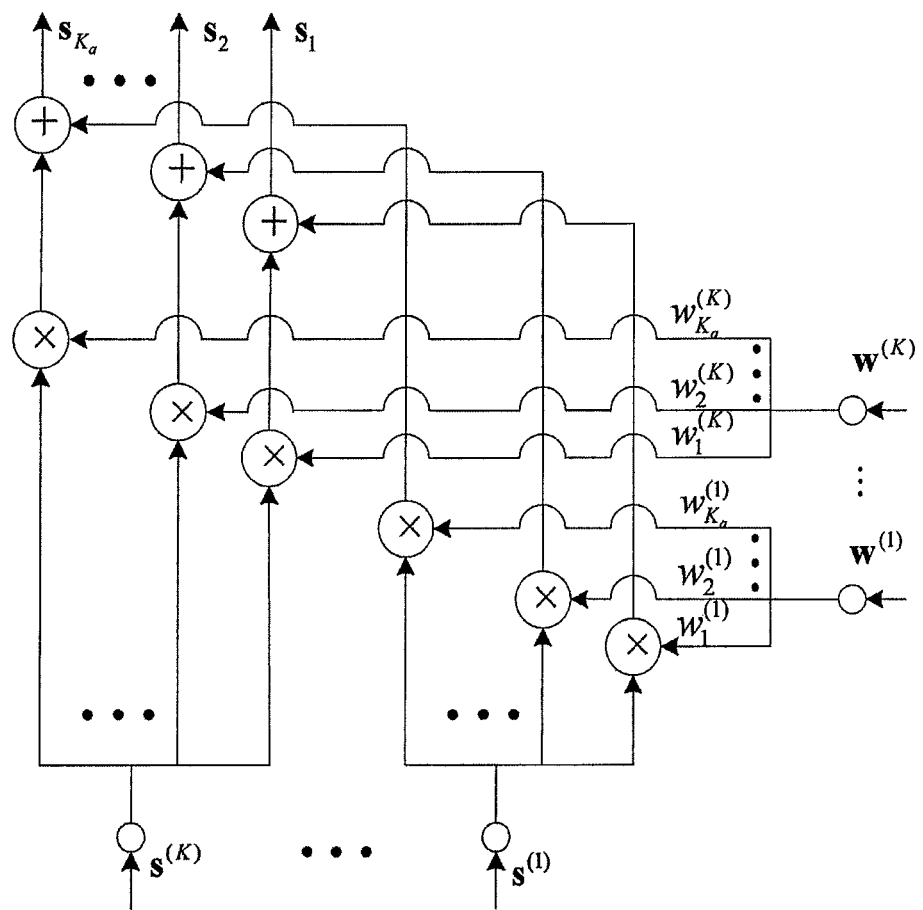
FIG. 4 is a schematic diagram showing a beam former used in the first embodiment.

In this step, beam forming can be implemented by the beam former shown in FIG. 4. As shown in FIG. 4, the transmitting data sequence $s^{(k)}$ of the $k^{th}$ expected user signal do AND with the beam forming weight coefficients $W_{k_a}^{(k)}$ at $k_a$ antennas, then do OR with this kind of operation results of other user signals to obtain the transmitting sequence $S_{k_a}$ at antenna $k_a$.

Figure 5:
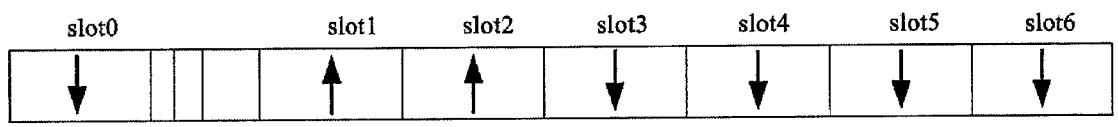
FIG. 5 shows a time slot structure and an allocation table of uplink/downlink time slots of the downlink beam forming method according to the second embodiment.
Figure 6:
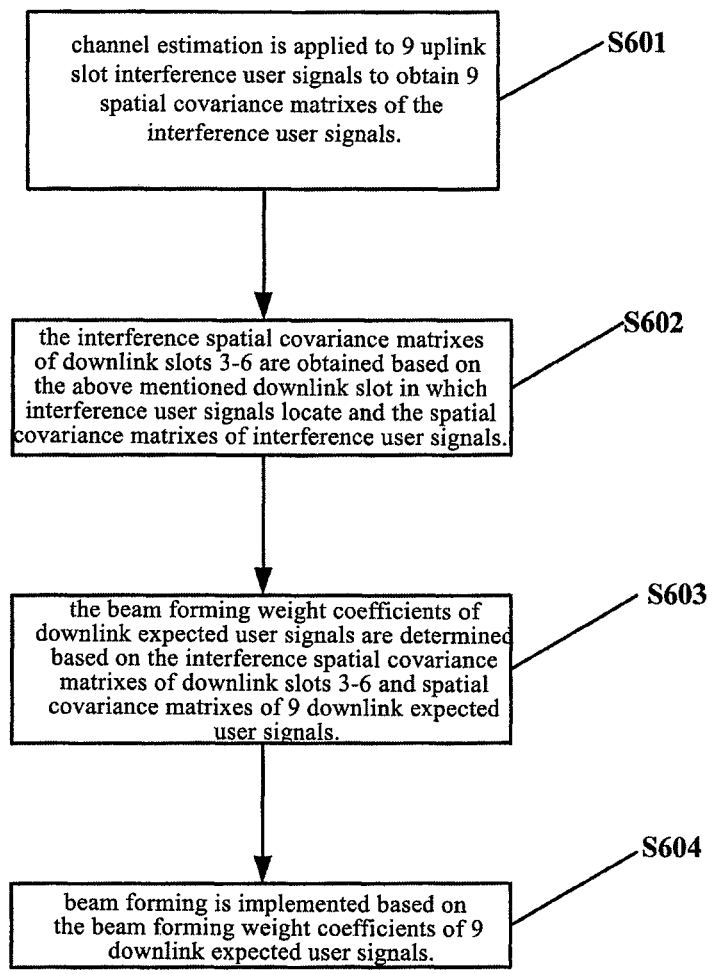
FIG. 6 is a flowchart according to the second embodiment of the invention.

By combining with FIGS. 5, 6, a TD-SCDMA system is taken as an example to explain the beam forming method disclosed in the invention.

As shown in FIG. 5, in this embodiment, there are totally six service slots (slot 1 to slot 6). Slots 1, 2 are used for uplink and slots 3, 4, 5, 6 are used for downlink. In uplink slot 1, 4 interference user signals are detected; they are marked as interference user signals 1', 2', 3' and 4' respectively. In uplink slot 2, 5 interference user signals are detected; they are marked as interference user signals 5', 6', 7', 8', and 9' respectively.

As shown in FIG. 6, in step S601, channel estimation is applied to 9 uplink slot interference user signals to obtain 9 spatial covariance matrixes of the interference user signals. In this embodiment, the interference user signals 1' to 4' are estimated in uplink slot 1, and the interference user signals 5' to 9' are estimated in uplink slot 2. The obtained spatial covariance matrix of interference user signals is $$R_I^{(1)}, R_I^{(2)}, \ldots, R_I^{(9)}$$

Furthermore, in this step, it is required to determine the downlink slot $t_d(m)$, m=1, 2 ... 9 of 9 interference user signals. According to this embodiment, the downlink slot in which interference user signals locate is obtained by the signaling transmission method. A base station should apply to obtain the downlink slot allocation number of inference user signals from RNC via signaling of Iub interface (an interface between Radio Access Network Controller RNC and the base station), signaling of Iur interface (an interface between two RNCs) (or signaling of Iu interface between a wireless access network and a core network) or an operation maintenance (OM) channel.

The base station obtains the downlink slot sequence number of inference user signals by signaling as following:

$t_d(1)=3$
$t_d(2)=3$
$t_d(3)=3$
$t_d(4)=4$
$t_d(5)=4$
$t_d(6)=5$
$t_d(7)=5$
$t_d(8)=5$
$t_d(9)=6$

Then, entering step S602, the interference spatial covariance matrixes of downlink slots 3-6 are obtained based on the above mentioned downlink slot in which interference user signals locate and the spatial covariance matrixes of interference user signals.

$$R_{I,3} = \sum_{\forall u_m | t_d(m)=3} R_I^{(m)} = R_I^{(1)} + R_I^{(2)} + R_I^{(3)}$$

$$R_{I,4} = \sum_{\forall u_m | t_d(m)=4} R_I^{(m)} = R_I^{(4)} + R_I^{(5)}$$

$$R_{I,5} = \sum_{\forall u_m | t_d(m)=5} R_I^{(m)} = R_I^{(6)} + R_I^{(7)} + R_I^{(8)}$$

$$R_{I,6} = \sum_{\forall u_m | t_d(m)=6} R_I^{(m)} = R_I^{(9)}$$

Then, entering step S603, the beam forming weight coefficients of downlink expected user signals are determined based on the interference spatial covariance matrixes of downlink slots 3-6 and spatial covariance matrixes of 9 downlink expected user signals. Taking the downlink user 6 as an example, downlink user 6 needs to transmit data in both slot 5 and slot 6. Then, the beam forming coefficients of downlink user 6 in slot 5 and slot 6 can be calculated respectively. Here λ=0.5, $$w_{TS5}^{(6)} = \underset{w}{\text{argmax}}\left(\frac{w^H R_{xx}^{(6)} w}{w^H (R_{I,5} + \lambda I) w}\right)$$

$$w_{TS6}^{(6)} = \underset{w}{\text{argmax}}\left(\frac{w^H R_{xx}^{(6)} w}{w^H (R_{I,6} + \lambda I) w}\right)$$

Finally, entering step S604, beam forming is implemented based on the beam forming weight coefficients of 9 downlink expected user signals. It is assumed that the transmitting sequence of the expected user signal k (k=1, 2 . . . 9) is $s^{(k)}$, then the transmitting sequence at antenna $k_a$ ($k_a$=1, 2 . . . $K_a$) is $$s_{k_a} = \sum_{k=1}^{K} s^{(k)} w_{k_a}^{(k)},$$

wherein $W_{k_a}^{(k)}$ represents the downlink transmitting beam forming weight coefficient of the $k^{th}$ expected user signal at the $k_a^{th}$ antenna.

Figure 7:
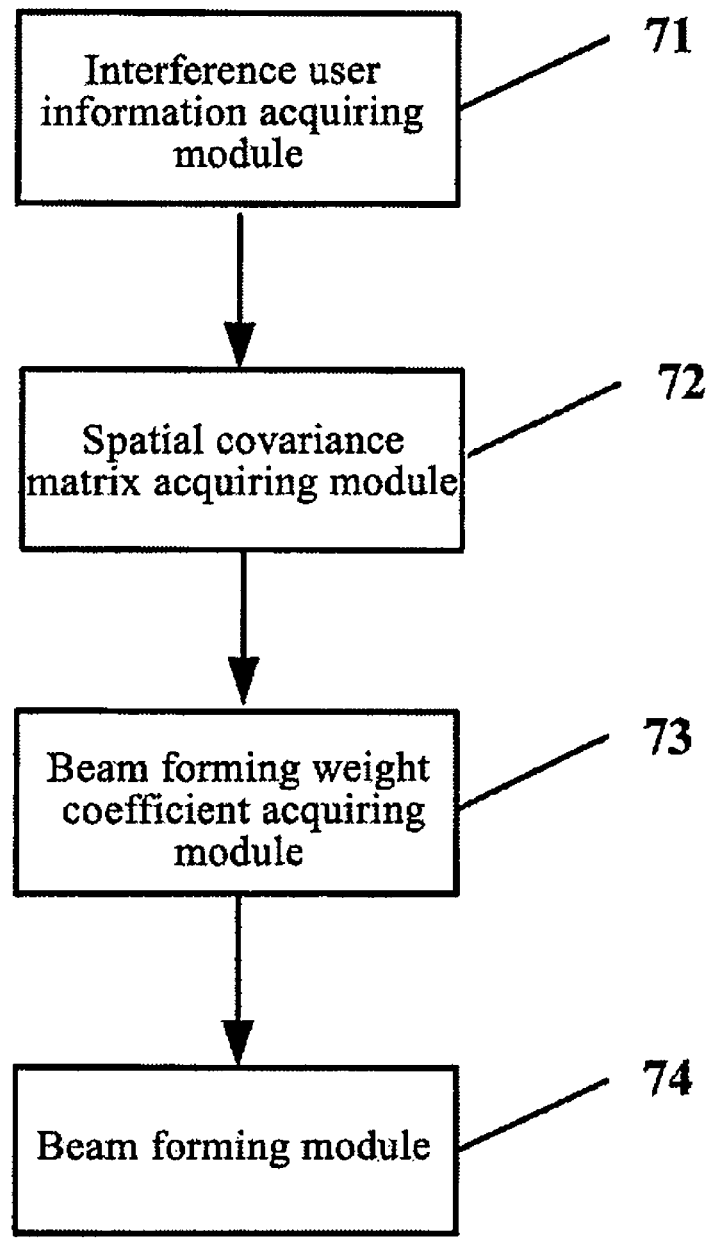
FIG. 7 is a schematic diagram showing architecture of a downlink beam forming device according to the invention.

FIG. 7 is a schematic diagram showing architecture of a downlink beam forming device in a TD-CDMA system according to the invention. The device includes an inference user information acquiring module 71, a spatial covariance matrix acquiring module 72, a beam forming weight coefficient acquiring module 73 and a beam forming module 74:

The inference user information acquiring module is used to determine all uplink slot inference user signals and the downlink slot in which the interference user signals locate. The module is implemented as following:

The interference user signals are determined by the power threshold of the interference signals. An interference user signal may be either the interference user signal in a local cell or that in other cells. Whether the user signals occupying the same wireless resource are regarded as interference user signals is related to the specific system and algorithms in the physical layer. For example, when beam forming is applied to a TD-SCDMA (Time Division-Synchronous Code Division Multiple Access) system using joint detection technique, it is assumed that signal interference in the local cell is eliminated by the joint detection and only user signal interference from other cells is considered.

Since a base station can provide the corresponding relationship between uplink slots and downlink slots of user signals in the same cell, the base station can obtain the downlink slots in which the interference user signals in the same cell locate. In respect to user signals from other cells, the methods to determine the downlink slots in which interference user signals locate include a predefined method, a signaling transmission method and a table lookup method:

(1) The predefined method: this is a default method. At the network initialization, the corresponding relationship between the uplink slots and the downlink slots in which all signals of users in cells locate can be determined.

(2) The signaling transmission method: a base station applies to obtain the sequence number of the downlink slots in which interference user signals locate from RNC (Radio Access Network Controller).

(3) The table lookup method: if interference user signals are all in the cell controlled by the same base station, that base station can obtain the sequence number of the downlink slots in which interference user signals locate by looking up a table.

The spatial covariance matrix acquiring module is used to implement channel estimation for all uplink slot interference user signals acquired by the interference user information acquiring module to obtain the spatial covariance matrixes of all uplink interference user signals. Then, the interference spatial covariance matrixes of each downlink slot are obtained based on the downlink slot in which the interference user signals determined by the interference user information acquiring module locate and the spatial covariance matrixes of the interference user signals.

For example, there are totally M interference user signals $u_1, u_2, \ldots, u_M$ in all uplink slots. Firstly, channel estimation is applied to M interference user signals, channel estimation may be implemented by a fundamental Steiner channel estimator (a low cost estimation method) or its modifications. Then, M spatial covariance matrixes are obtained by calculation.

$$R_I^{(1)}, R_I^{(2)}, \ldots, R_I^{(M)}$$

wherein, $$R_I^{(m)} = E\{H_I^{(m)} H_I^{(m)H}\}, m=1, \ldots, M$$

$H_I^{(m)}$ represents the multiple antenna channel estimation for the $m^{th}$ interference user signal, $H_I^{(m)H}$ represents the conjugate transpose operation of $H_I^{(m)}$, and $E\{H_I^{(m)} H_I^{(m)H}\}$ represents an operation to solve the mathematics expectation of random variables, that is, a mean value.

It is assumed that there are totally N downlink slots in the same cell. Then, the interference signal of any downlink slot n (n=1, 2, . . . N) is $$I_n = \{\forall u_m | t_d(m) = n\},$$

wherein, $\forall u_m$ represents any or all uplink slot interference user signals $u_m$.

The spatial covariance matrix of interference signals in slot n is $$R_{I,n} = \sum_{\forall u_m | t_d(m) = n} R_I^{(m)},$$

That is, the spatial covariance matrix of interference signals in slot n is the sum of the spatial covariance matrixes of all interference user signals in slot n.

The beam forming weight coefficient acquiring module is used to determine the beam forming weight coefficient of downlink expected user signals slot based on the interference spatial covariance matrixes of each downlink slot and the spatial covariance matrixes of the downlink expected user signals. It is assumed that the slot is n in which some downlink expected user k locates, then the downlink beam forming weight coefficient is $$w^{(k)} = \underset{w}{\text{argmax}}\left(\frac{w^H R_{xx}^{(k)} w}{w^H (R_{I,n} + \lambda I) w}\right)$$

wherein, $$\underset{w}{\mathrm{argmax}}\left(\frac{w^H R_{xx}^{(k)} w}{w^H (R_{I,n} + \lambda I) w}\right)$$

represents w making $$\frac{w^H R_{xx}^{(k)} w}{w^H (R_{I,n} + \lambda I) w}$$

maximum, w may be any variable, I represents a unit array of antenna dimensions, λ may represents noise power or a constant factor proportional to interference power, and $R_{xx}^{(k)}$ represents the spatial covariance matrix of $k^{th}$ downlink expected user signal. The matrix may be obtained by measurement. $W^{(k)}$(k=1, 2 ... K) represents downlink transmitting beam forming weight coefficient of expected user signals, and $$w^{(k)} = \begin{bmatrix} w_1^{(k)} \\ w_2^{(k)} \\ \vdots \\ w_{K_a}^{(k)} \end{bmatrix},$$

$W_{k_a}^{(k)}$ represents the downlink transmitting beam forming weight coefficient of $k^{th}$ expected user signal in the $k_a^{th}$ antenna.

The beam forming module is used to implement beam forming based on the beam forming weight coefficients of the downlink expected user signals. It is assumed that the transmitting data sequence of the expected user signal k is $s^{(k)}$, then the transmitting sequence at antenna $k_a$($k_a$=1, 2 ... $K_a$) is $$s_{k_a} = \sum_{k=1}^{K} s^{(k)} w_{k_a}^{(k)}.$$

The beam forming module can be implemented by the beam former shown in FIG. 4. As shown in FIG. 4, the transmitting data sequence $s^{(k)}$ of the $k^{th}$ expected user signal do AND with the beam forming weight coefficients $W_{k_a}^{(k)}$ at $k_a$ antennas, then do OR with this kind of operation results of other user signals to obtain the transmitting sequence $S_{k_a}$ in antenna $k_a$.

The above mentioned spatial covariance matrix acquiring module and the beam forming weight coefficient acquiring module may be implemented by software in computation device or apparatus, or by specific hardware devices.

The above mentioned are only the embodiments of the invention. It should be understood that those skied in the art may make variations and modifications without departing from the scope of the present invention.

The invention claimed is:

1. A downlink beam forming method in a Time Division-Synchronous Code Division Multiple Access (TD-SCDMA) system, comprising:
acquiring spatial covariance matrixes of all uplink slot interference user signals by the following formula to obtain M spatial covariance matrixes and determining downlink slots in which the interference user signals locate, $R_I^{(m)} = E\{H_I^{(m)} H_I^{(m)H}\}$, m=1, ..., M, where $E\{H_I^{(m)} H_I^{(m)H}\}$ represents an operation to solve a mathematical expectation of a random variable, M is the number of the interference user signals, $H_I^{(m)}$ represents multiple antenna channel estimation of the $m^{th}$ interference user, and $H_I^{(m)H}$ represents a conjugate transpose operation of matrix $H_I^{(m)}$;

obtaining an interference spatial covariance matrix of each downlink slot based on the downlink slots in which the interference user signals locate and the spatial covariance matrixes of the interference user signals by the following formula to calculate the interference spatial covariance matrix of each downlink slot, $$R_{I,n} = \sum_{\forall u_m | t_d(m)=n} R_I^{(m)},$$

where $u_m$ represents the $m^{th}$ interference user signal, $t_d$(m) represents the downlink slot in which the $m^{th}$ interference user signal locates, and n represents the number of any downlink slot;

determining beam forming weight coefficients of downlink expected user signals based on the interference spatial covariance matrixes of each downlink slot and spatial covariance matrixes of downlink expected user signals by the following formula to calculate the beam forming weight coefficients of the downlink expected user signals, $$w^{(k)} = \underset{w}{\mathrm{argmax}}\left(\frac{w^H R_{xx}^{(k)} w}{w^H (R_{I,n} + \lambda I) w}\right),$$

where k is a positive integer, w represents any variable, $w^H$ represents a conjugate transpose operation of w, I represents a unit array of antenna dimensions, λ represents noise power or a constant factor proportional to the interference power, and w(k) represents the beam forming weight coefficient of the $k^{th}$ downlink expected user signal; and implementing beam forming based on the beam forming weight coefficients of the downlink expected user signals by the following formula to calculate the transmitting sequences, $$s_{k_a} = \sum_{k=1}^{K} s^{(k)} w_{k_a}^{(k)},$$

where $S_{k_a}$ represents the transmitting sequence of the $ka^{th}$ antenna, $s^{(k)}$ represents the transmitting sequence of the $k^{th}$ downlink expected user signal, ka represents the $ka^{th}$ antenna, and $W_{k_a}^{(k)}$ represents the beam forming weight coefficient of the $k^{th}$ downlink expected user signal at the $ka^{th}$ antenna.

2. The downlink beam forming method in a TD-SCDMA system according to claim 1, wherein, the step of determining downlink slots in which the interference user signals locate comprises:
at the network initialization, determining a corresponding relationship between the uplink slots and the downlink slots in which all predefined cell user signals locate;
a base station acquiring the number of the downlink slots in which the interference user signals locate from a Radio Access Network Controller (RNC) by signaling; or if interference user signals are all in cells controlled by a same base station, the base station obtaining the number of the downlink slots in which the interference user signals locate by looking up a table.

3. The downlink beam forming method in a TD-SCDMA system according to claim 1, wherein, the step of beam forming is implemented by a multiple user signal beam former.

4. A downlink beam forming apparatus in a Time Division-Synchronous Code Division Multiple Access (TD-SCDMA) system, comprising:
an interference user information acquiring module, for acquiring spatial covariance matrixes of all uplink slot interference user signals by the following formula to obtain M spatial covariance matrixes and determining the downlink slots in which the interference user signals locate, $R_I^{(m)} = E\{H_I^{(m)} H_I^{(m)H}\}$, m=1, . . . , M, where $E\{H_I^{(m)} H_I^{(m)H}\}$ represents an operation to solve a mathematical expectation of a random variable, M is the number of the interference user signals, $H_I^{(m)}$ represents multiple antenna channel estimation of the m$^{th}$ interference user, and $H_I^{(m)H}$ represents a conjugate transpose operation of matrix $H_I^{(m)}$;
a spatial covariance matrix acquiring module, for obtaining interference spatial covariance matrixes of the downlink slots based on the downlink slots in which the uplink interference user signals locate, and acquiring spatial covariance matrixes of downlink expected user signals by the following formula to calculate the interference spatial covariance matrix of each downlink slot, $$R_{I,n} = \sum_{\forall u_m | t_d(m)=n} R_I^{(m)},$$

where $u_m$ presents the m$^{th}$ interference user signal, $t_d(m)$ represents the downlink slot in which the m$^{th}$ interference user signal locates, and n represents the number of any downlink slot;
a beam forming weight coefficient acquiring module, for determining the beam forming weight coefficients of the downlink expected user signals based on the interference spatial covariance matrixes of each downlink slot and the spatial covariance matrixes of the downlink expected user signals by the following formula to calculate the beam forming weight coefficients of the downlink expected user signals, $$w^{(k)} = \underset{w}{\arg\max}\left(\frac{w^H R_{xx}^{(k)} w}{w^H (R_{I,n} + \lambda I) w}\right),$$

where k is a positive integer, w represents any variable, $w^H$ represents a conjugate transpose operation of w, I represents a unit array of antenna dimensions, $\lambda$ represents noise power or a constant factor proportional to the interference power, and w(k) represents the beam forming weight coefficient of the k$^{th}$ downlink expected user signal; and
a beam forming module, for implementing beam forming based on the beam forming weight coefficients of the downlink expected user signals by the following formula to calculate the transmitting sequences, $$s_{k_a} = \sum_{k=1}^{K} s^{(k)} w_{k_a}^{(k)},$$

where $S_{k_a}$ represents the transmitting sequence of the ka$^{th}$ antenna, $s^{(k)}$ represents the transmitting sequence of the k$^{th}$ downlink expected user signal, ka represents the ka$^{th}$ antenna, and $W_{k_a}^{(k)}$ represents the beam forming weight coefficient of the k$^{th}$ downlink expected user signal at the ka$^{th}$ antenna.

5. The downlink beam forming apparatus in a TD-SCDMA system according to claim 4, the step of determining downlink slots in which the interference user signals locate by the interference user information acquiring module comprises:
at the network initialization, determining a corresponding relationship between the uplink slots and the downlink slots in which all predefined cell user signals locate;
a base station acquiring the number of the downlink slots in which the interference user signals locate from a Radio Access Network Controller (RNC) by signaling; or
if interference user signals are all in cells controlled by a same base station, the base station obtaining the number of the downlink slots in which the interference user signals locate by looking up a table.

6. The downlink beam forming apparatus in a TD-SCDMA system according to claim 4, wherein, the beam forming module is implemented by a multiple user signal beam former.

* * * * *